(12) United States Patent
Roychoudhury et al.

(10) Patent No.: US 8,557,189 B2
(45) Date of Patent: Oct. 15, 2013

(54) CATALYTIC SYSTEM FOR CONVERTING LIQUID FUELS INTO SYNGAS

(75) Inventors: Subir Roychoudhury, Madison, CT (US); Maxim Lyubovsky, Fairfax, VA (US); Curtis Morgan, Ansonia, CT (US); Joel DesJardins, Vernon, CT (US); Dennis Walsh, Richboro, PA (US)

(73) Assignee: Precision Combustion, Inc., North Haven, CT (US)

( * ) Notice: Subject to any disclaimer, the term of this patent is extended or adjusted under 35 U.S.C. 154(b) by 725 days.

(21) Appl. No.: 12/080,600

(22) Filed: Apr. 4, 2008

(65) Prior Publication Data

US 2009/0293358 A1 Dec. 3, 2009

Related U.S. Application Data

(63) Continuation-in-part of application No. 11/592,825, filed on Nov. 3, 2006, now abandoned.

(60) Provisional application No. 60/733,643, filed on Nov. 4, 2005.

(51) Int. Cl.
*B01J 19/00* (2006.01)

(52) U.S. Cl.
USPC .......................................... 422/198; 422/200

(58) Field of Classification Search
USPC .................................................. 422/198, 200
See application file for complete search history.

(56) References Cited

U.S. PATENT DOCUMENTS 2,809,104 A * 10/1957 Strasser et al. .................. 48/215
4,115,074 A    9/1978 Yoshida et al.
4,255,121 A    3/1981 Sugimoto
4,298,355 A    11/1981 Staudinger
4,381,187 A    4/1983 Sederquist
4,921,765 A *  5/1990 Gmeindl et al. .............. 429/411
5,026,536 A    6/1991 Shioiri et al.
5,051,241 A    9/1991 Pfefferle
5,069,685 A    12/1991 Bissett et al.
6,284,398 B1   9/2001 Kiryu (Continued)

FOREIGN PATENT DOCUMENTS

DE     19930051 A1   1/2001
WO  WO 2004060546 A2   7/2004

OTHER PUBLICATIONS

Co-pending U.S. Appl. No. 11/592,825 entitled "Catalytic System For Converting Liquid Fuels Into Syngas," filed Nov. 3, 2006, in the names of Maxim Lyubovsky and Subir Roychoudhury: published as U.S. application publication No. 2007/0151154 on Jul. 5, 2007.

(Continued)

*Primary Examiner* — Paul Wartalowicz

(57) ABSTRACT

The present invention provides a system for the gasification of a liquid fuel and includes providing a supply of a liquid fuel and an oxidant, atomizing the liquid fuel and mixing it with the oxidant, catalytically reacting the fuel oxidant mixture, providing an ignition source for initiating the catalytic reaction, positioning a heat exchanger in proximity with the catalytic bed, and producing steam which can be fed back into the system thereby eliminating the need for a vaporizer. A hydrocarbon fuel can be mixed with oxygen, as a constituent of air, preferably forming a fuel rich fuel air mixture that passes through a catalytic reactor having an ultra-short channel length metal monolith substrate.

10 Claims, 8 Drawing Sheets

(56) References Cited

U.S. PATENT DOCUMENTS

| | | | |
|---|---|---|---|
| 6,641,625 B1* | 11/2003 | Clawson et al. | 48/127.9 |
| 6,767,518 B2 | 7/2004 | Ichikawa | |
| 6,783,742 B2 | 8/2004 | Bentley | |
| 7,156,886 B2 | 1/2007 | Nakamura | |
| 2002/0018739 A1* | 2/2002 | Johnston et al. | 422/198 |
| 2002/0071790 A1 | 6/2002 | Woods et al. | |
| 2002/0083646 A1 | 7/2002 | Deshpande et al. | |
| 2002/0114747 A1* | 8/2002 | Marchand et al. | 422/198 |
| 2002/0172630 A1* | 11/2002 | Ahmed et al. | 422/190 |
| 2003/0072700 A1 | 4/2003 | Goebel et al. | |
| 2005/0028445 A1 | 2/2005 | Roychoudhury et al. | |
| 2005/0274107 A1 | 12/2005 | Liu et al. | |
| 2007/0151154 A1 | 7/2007 | Lyubovsky | |
| 2008/0127553 A1 | 6/2008 | Roychoudhury | |
| 2008/0169449 A1 | 7/2008 | Mundschau | |
| 2009/0228146 A1 | 9/2009 | Roychoudhury | |
| 2009/0252661 A1 | 10/2009 | Roychoudhury | |

OTHER PUBLICATIONS

U.S. Appl. No. 10/324,464, entitled "Method for Oxidative Reforming," filed Dec. 19, 2002, in the name of Maxim Lyubovsky, unpublished and abandoned.

Copending U.S. Appl. No. 12/460,543, entitled "Reactor Flow Control Apparatus," filed Jul. 21, 2009, in the name of Subir Roychoudhury, et al.; currently unpublished.

* cited by examiner

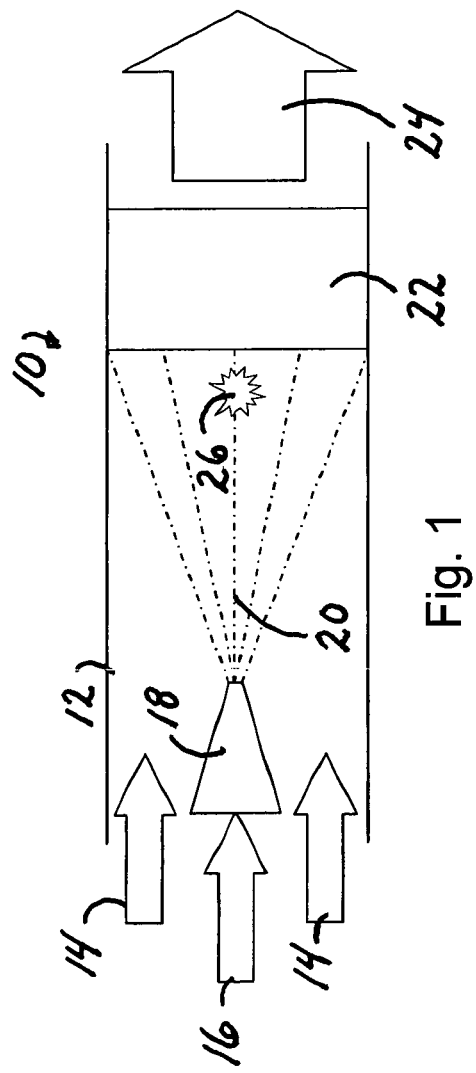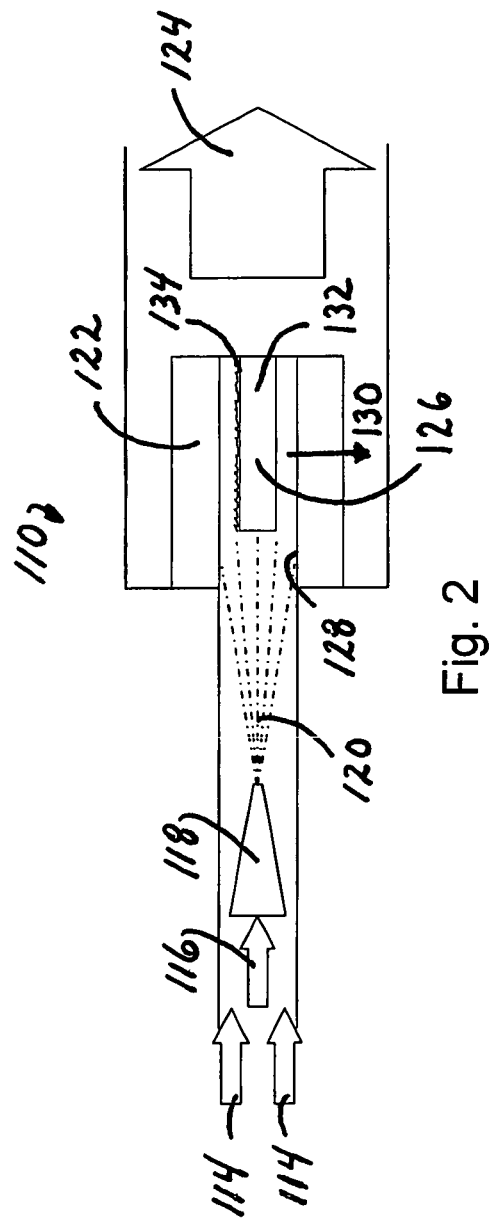

| | |
|---|---|
| $H_2$ | 29.41% |
| $O_2$ | 0.00% |
| $N_2$ | 47.68% |
| $CH_4$ | 0.19% |
| CO | 16.46% |
| $CO_2$ | 7.40% |
| Ethylene | 0.05% |
| Ethane | 0.01% |
| Propylene | 0.03% |
| Propane | 0.01% |

CATALYTIC SYSTEM FOR CONVERTING LIQUID FUELS INTO SYNGAS

CROSS-REFERENCE TO RELATED APPLICATION

This application is a continuation-in-part of U.S. patent application Ser. No. 11/592,825 filed Nov. 3, 2006 now abandoned; which, in turn, claims the benefit of U.S. Provisional Application No. 60/733,643 filed Nov. 4, 2005.

GOVERNMENT RIGHTS

This invention was made with government support under Government Contract No. W56HZV-04-C-0688. The U.S. government has certain rights in this invention.

BACKGROUND OF THE INVENTION

1. Field of the Invention

The present invention is directed to a method and system for the process of reactively converting a liquid fuel into a gasified stream. More particularly, the method and system of the present invention provide a novel means for converting the liquid fuel into a gas by partial oxidation and steam reforming. In addition, when fuels containing sulfur are used, a device according the present invention can be employed to provide de-sulfurization.

2. Brief Description of the Related Art

Gasification of liquid fuels typically comprises use of a vaporizer. Vaporization of liquid fuels (e.g., alcohols, hydrocarbons) typically is achieved by indirectly supplying heat into a stream of liquid fuel via heat exchange with a hot wall. One disadvantage of this method is that the rate of vaporization is limited by the rate of heat transfer such that relatively large surface area is required for fuel vaporization. Another disadvantage of this method, especially for vaporizing long chain hydrocarbons, is that heating the fuel stream to the vaporization temperature tends to cause fuel decomposition and formation of deposits. More specifically, coke formation is problematic. Moreover, preventing deposits from forming within the fuel passages in the nozzle during steady state operation due to heat-up of the nozzle from the downstream hot zone is challenging.

Another known method for gasification of a fuel stream comprises mixing atomized fuel with a hot gas such as superheated steam that supplies the heat required for fuel vaporization and prevents coke formation. However, the large amounts of superheated steam required in this method result in a large heat load for steam production.

Spray methods for atomization of liquid fuels known in the art include air-blast or pressure atomizers, ultrasonic and electrospray atomizers. These spray systems are capable of providing a uniform distribution of atomized fuel across the entrance of the catalyst bed. Such atomizers may include a co-flow of air that allows mixing of the fuel and oxidizer. However, very fine and uniform droplet size along with homogeneous fuel-air distribution, required to avoid coke formation and obtain temperature/mixture uniformity in the reactor, is difficult to achieve in practical systems.

Ignition devices, such as a spark or glow plugs, are widely used to ignite fuel-oxidizer mixtures at startup. These devices often are subject to failure due to the high operating temperatures by virtue of their location required for ignition.

Monoliths are commonly used catalyst substrates for the gasification of liquid fuel. Fuel oxidizer mixture inhomogeneities are usually detrimental to these substrates as they lead to localized lean or rich zones respectively causing hot spots or carbon precipitation regions. Since there is no opportunity for these zones to re-mix within the long, separated channels of a monolith, these substrates are particularly vulnerable. In addition, carbon precipitation is favored in monoliths due to the boundary layers that develop in these substrates.

Combustion of liquid fuels in fuel cell or internal combustion engine systems poses significant problems, especially for fuels with high aromatic content and wide boiling point distribution. This can be attributed to the propensity of the heavier aromatic compounds in the fuel to form deposits or coke when vaporized at high temperatures.

Liquid hydrocarbon fuels such as gasoline, kerosene or diesel may be used with high temperature solid oxide fuel cells ("SOFC") to directly produce electric power. For these fuel cells, the choice of fuel is not limited to pure hydrogen as is the case for low temperature proton exchange membrane ("PEM") fuel cells. Conversion of the hydrocarbon fuel into gaseous mixture containing syngas, though, is required before the fuel may be fed to the SOFC. Furthermore, removal of sulfur normally contained in the fuel prior to feeding to the SOFC is needed.

These and other known methods and systems for gasification of liquid fuels, together with their associated disadvantages, are described further in U.S. patent application Ser. No. 10/902,512 filed on Jul. 29, 2004; which is incorporated herein in its entirety.

Gasification and pre-reforming of liquid fuel would resolve many of the issues noted above with respect to the prior art. Accordingly, there is a need for a pre-reforming reactor capable of operating with a range of liquid fuels. It is therefore an object of the present invention to provide a pre-reforming reactor for partially oxidizing and cracking the heavy components of the fuel. The pre-reformed fuel subsequently can be further reformed or combusted to power fuel cell systems, internal combustion engines, burners, and other known devices.

It is therefore another object of the current invention to provide a catalyst substrate that facilitates mixing of the stream flowing therethrough, for example a substrate having plurality of voids in random order and short channels extending in the downstream direction the length of which is similar to the channel diameter. Such a configuration results in a comparatively high conversion rate of the reactants to the desired products and minimizes break through of unreacted fuel.

It also is an object of the current invention to provide a catalytic reactor for the gasification of liquid fuels comprising a catalyst that yields partial oxidation products, such as CO and $H_2$. This results in a higher level of fuel conversion for the same amount of added air and produces hydrogen-rich gas directly from the gasifier reactor. It is a further object of the current invention to provide a method whereby steam or atomized water and/or $CO_2$ may be added to the fuel/air stream to adjust the amount of hydrogen in the product stream. It also is a further object of the current invention to provide a method whereby no external pre-heating of either air or fuel is required.

Lastly, it is a further object of the present invention to provide de-sulfurization of the fuel in the liquid form when required by a particular application of the gasification system taught herein.

DESCRIPTION OF THE INVENTION

The system of the present invention eliminates the need for a liquid fuel vaporizer in a typical gasification system. By eliminating the vaporizer, an essential and critical part of the reforming systems known in the art, the entire system is less complex and more robust. Vaporizing hydrocarbon fuels is difficult because of low decomposition temperature of these fuels which leads to coke deposits and clogging of the fuel delivery lines. Spraying cold fuel directly into the catalyst bed eliminates this problem.

In one embodiment of this invention, a heat exchanger is positioned downstream of the catalyst bed thereby utilizing the heat generated in the reforming reaction to produce steam required for the system while cooling the reformate stream to the temperature required by the downstream components, i.e. de-sulfurization bed.

In yet another embodiment of this invention, a de-sulfurization bed is positioned downstream of the catalyst bed. In other systems known in the art, de-sulfurization is achieved by de-sulfurization of the fuel in the liquid form in a hydro-de-sulfurization ("HDS") process prior to the reforming process.

In summary, the present invention is a system for converting liquid fuels into gas mixture containing CO and H2 (syngas). The system is comprised of: (i) a nozzle; (ii) a catalyst bed in fluid communication with the nozzle exhaust stream; (iii) a heat source for igniting the catalyst; and (iv) a heat exchanger. The hot side of the heat exchange is in fluid communication with the catalyst bed and the cold side of the heat exchanger in fluid communication with the nozzle.

Atomized liquid fuel is exits the nozzle in a stream comprising an oxidizer and optional steam. In most applications, oxygen as a constituent of air is a preferred oxidizer. The ratio of the fuel stream to the oxidizer stream should be such that there is insufficient amount of oxidizer to completely oxidize all fuel into CO2 and H2O, i.e. the ratio should be fuel rich.

The fuel entering the nozzle is cold (i.e., below the temperature at which the fuel starts to decompose creating coke deposits). The nozzle design is such that the liquid fuel remains cold before exiting the nozzle. This is an important point distinguishing this invention from previous methods, for example U.S. Pat. No. 4,381,187.

The nozzle may be of any type (i.e., based on pressure atomization, air blast, ultrasonic atomization, electrospray, or other type known in the art). The nozzle provides fine atomization of cold liquid fuel and uniform distribution of the atomized fuel within the inlet air or optionally steam containing inlet air. Appropriate nozzles in which reaction air and/or steam flow and/or fuel flow are used to atomize liquid fuel.

The catalyst bed comprises catalyst suitable for supporting partial oxidation and reforming reactions. Preferably the catalyst is one of the metals of group VIII of the periodic system of elements, preferably, rhodium. The substrate on which the catalyst is supported preferably provides good mixing for the fuel/oxidizer mixture passing therethrough. To provide good mixing capabilities, the substrate preferably comprises a multiplicity of void volumes in random order. This may be best achieved by using porous metal or ceramic substrates or by using multiple ceramic or metal screens or foams.

The preferred catalyst bed geometry provides a decreasing mass flux of the reactive mixture flow through the catalyst bed as disclosed in U.S. patent application Ser. No. 10/324,464 filed Dec. 19, 2002; the contents of which are incorporated herein in its entirety, particularly the teachings at Paragraphs 0014-0031 including FIGS. 1 and 2. As an example of such geometry is a coil of Microlith™ short-contact-time, ultra-short-channel-length substrate and catalyst where the reactive mixture is introduced in the ID plenum and the reformed gas exits at the OD of the coil. Preferred catalyst formulations could be used on different parts of the coil. Microlith™ short-contact-time, ultra-short-channel-length substrate is available from Precision Combustion, Inc., 410 Sackett Point Road, North Haven, Conn.

The nozzle and the catalyst bed are arranged in such a way that the stream of atomized fuel mixed with air and steam provided by the nozzle is uniformly distributed across the entry face of the catalyst bed. It is preferred that the rate of flow of the reacting mixture through the catalyst bed is sufficiently high such that significant amounts of partial oxidation products (i.e., CO and H2) are formed. When partial oxidation products are formed, less heat is released thereby resulting in lower temperatures of the catalyst bed.

The heat/ignition source is placed in closed proximity with the catalyst bed. It is required for the initial pre-heat of the catalyst to the temperature where the oxidation reaction between the fuel and the oxidant would ignite. The heat source may be of any type known in the art. An electrically heated glow plug is a preferred heat source.

The heat exchanger downstream of the catalyst bed can be any type of a heat exchanger known in the art. The heat exchanger should be placed such that the gaseous reformate flow exiting the catalyst bed passes on the hot side the heat exchanger. The heat exchanger then cools the reformate flow to the required temperature. The heat exchanger vaporizes cold liquid water to produce steam which is fed to the nozzle outlet.

In some embodiments of the invention, a sulfur removal bed may be placed in fluid communication with the heat exchanger. In this embodiments, the cooled reformate stream containing sulfur in the form of $H_2S$ exiting the heat exchanger passes through the sulfur removal bed to provide a sulfur free reformate stream.

The method and system of the present invention provide gasification of liquid fuel without a requirement for supplying external heat or steam to the gasifier. Fuel and air may be supplied to the gasifier at ambient temperatures. This allows a smaller mixing volume, since the catalytic bed tolerates partial unmixedness, and a simpler fuel and air delivery system design. This also allows a means for start up and operation in the absence of initial heat at the reactor inlet. More importantly, the method and system of the present invention provide a means for the gasification of a liquid fuel without the use of an external vaporizer.

BRIEF DESCRIPTION OF THE DRAWINGS

FIG. 1 depicts a schematic representation of an embodiment of a gasification system.

FIG. 2 depicts a schematic representation of another embodiment of a gasification system according.

DETAILED DESCRIPTION OF THE INVENTION

Figure 3:
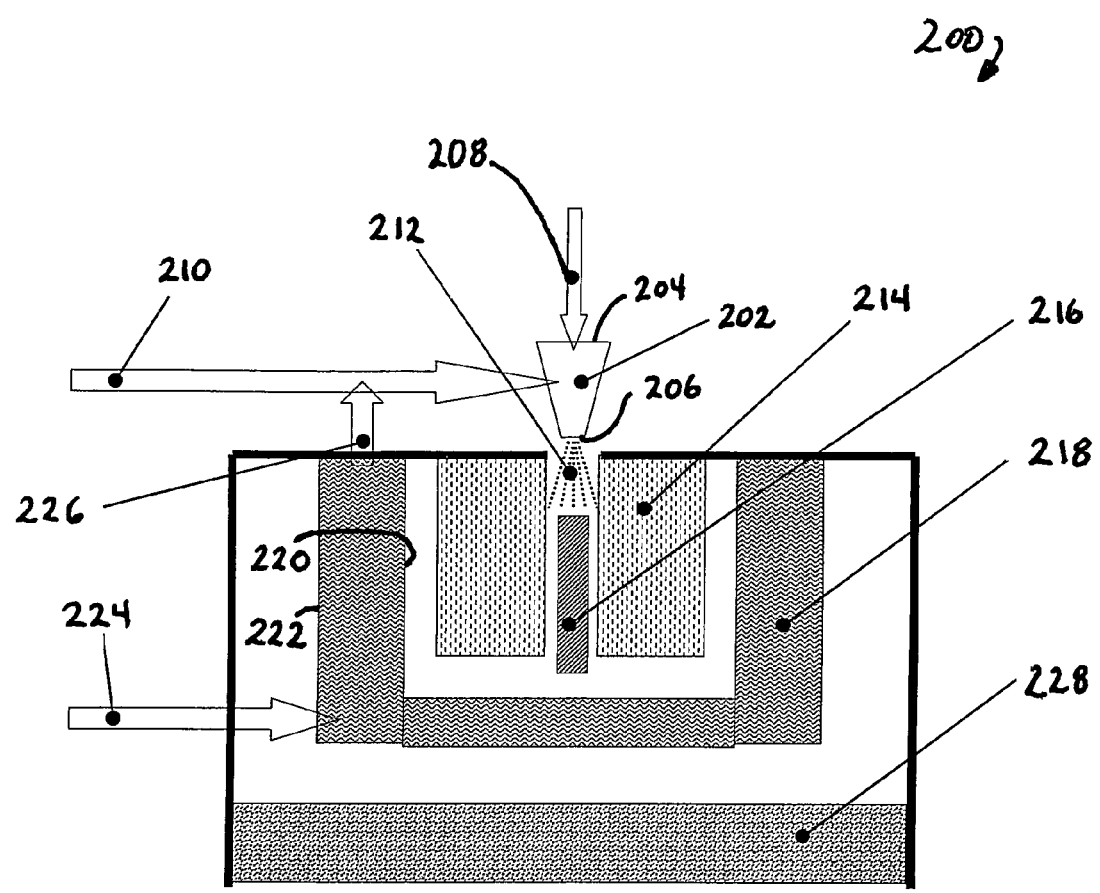
FIG. 3 depicts a diagrammatic representation of a detailed design of a gasification system according to the present invention.

As depicted schematically in FIG. 1, a typical gasification system (10) comprises a path (12) defining a flow of air (14). Fuel stream (16) is introduced into injector (18), which atomizes fuel stream (16). Atomized fuel (20) and air (14) enter catalyst bed (22) where fuel (20) is additionally mixed, vaporized and partially reformed. Gasified fuel stream (24) leaves the catalyst bed (22). Ignition source (26), in close proximity with catalyst bed (22), is used to initiate the process.

FIG. 2 schematically depicts alternative gasification system (110). Functional elements corresponding to those depicted in FIG. 1 are referenced by corresponding 100-series reference numbers. In this embodiment, catalyst bed (122) defines a cylindrical shape and comprises a wound catalytically coated, short-contact-time, ultra-short-channel-length substrate. Atomized fuel (120) and airflow (114) enter into the inner diameter (128) of catalyst bed (122) and flow out radially (130) through catalyst bed (122). The igniter (126) in this embodiment comprises an electric glow plug (132) placed inside inner diameter (128) of catalyst bed (122). Glow plug (132) may be coated with catalyst (134) to further assist the start up process. Electric current initially is supplied to glow plug (132) to preheat catalyst bed (122) to the start up temperature. Fuel stream (116) is introduced into injector (118), and air (114) is then mixed with atomized fuel (120) causing catalyst bed (122) to heat up to the operating temperature at which point the electric current to the glow plug (132) is stopped. Gasified fuel stream (124) exits the system (110).

FIG. 3 depicts a diagrammatic representation of a design of a gasification system (200) according to the present invention for converting liquid fuels into gas mixture containing CO and H2 (syngas). The system (200) is comprised of a nozzle (202) having an inlet (204) and an outlet (206). A cold fuel liquid stream (208) and an inlet oxidizer stream (210) are introduced into the inlet (204) (which inlet may have more than one orifice). A nozzle exhaust stream (212) comprising atomized liquid fuel mixed with oxidizer and, if desired, steam exits nozzle (202) at outlet (206). Catalyst bed (214) is in fluid communication with the nozzle exhaust stream (212). The system (200) further comprises a heat source (216) for igniting the catalyst bed (214). A heat exchanger (218) is in fluid communication with, or placed in close proximity with, the catalyst bed (214) and the nozzle (202).

Atomized liquid fuel exits the nozzle (202) in exhaust stream (212) which further comprises an oxidizer and optional steam. In most applications, oxygen as a constituent of air is a preferred oxidizer. The ratio of the fuel stream to the oxidizer stream should be such that there is insufficient amount of oxidizer to completely oxidize all fuel into $CO_2$ and $H_2O$, (i.e., the ratio should be fuel rich).

Exhaust stream (212) is uniformly distributed across the entry face of the catalyst bed (214). Preferably, the reactive mixture comprising exhaust stream (212) is introduced in the ID plenum of the catalyst bed (214) and the reformed gas exits at the OD of the catalyst bed (214) coil.

The heat/ignition source (216) is placed in closed proximity with the catalyst bed (214) in order to pre-heat the catalyst bed (214) to the temperature where the oxidation reaction between the fuel and the oxidant ignite. Gaseous reformate flow exits the catalyst bed (214) in fluid communication with a first side (220) of heat exchanger (218). The gaseous reformate is then cooled to the required temperature by passing through, or in close proximity with, heat exchanger (218). The second side (222) of heat exchanger (218) vaporizes cold liquid water stream (224) to produce steam (226), which is fed to the inlet (204) of nozzle (202).

If desired, a sulfur removal bed (228) may be placed in fluid communication with the first side (220) of heat exchanger (218). In this embodiment, the cooled reformate stream containing sulfur in the form of $H_2S$ exiting the heat exchanger (218) passes through the sulfur removal bed (228) to provide a sulfur free reformate stream.

Figure 4B:
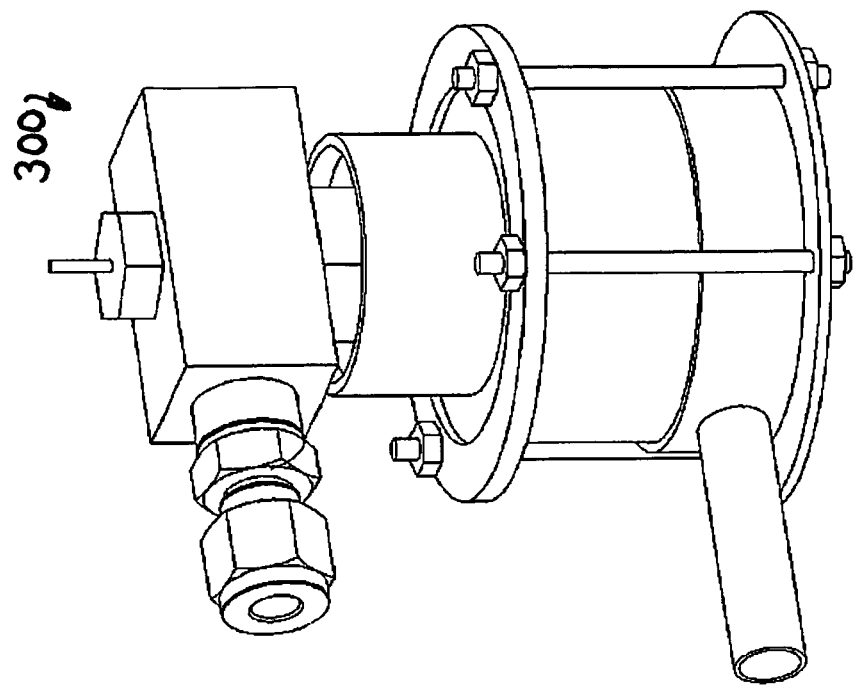
FIGS. 4a and 4b provide a three-dimensional rendering of a detailed design of a gasification system according to the present invention.
Figure 4A:
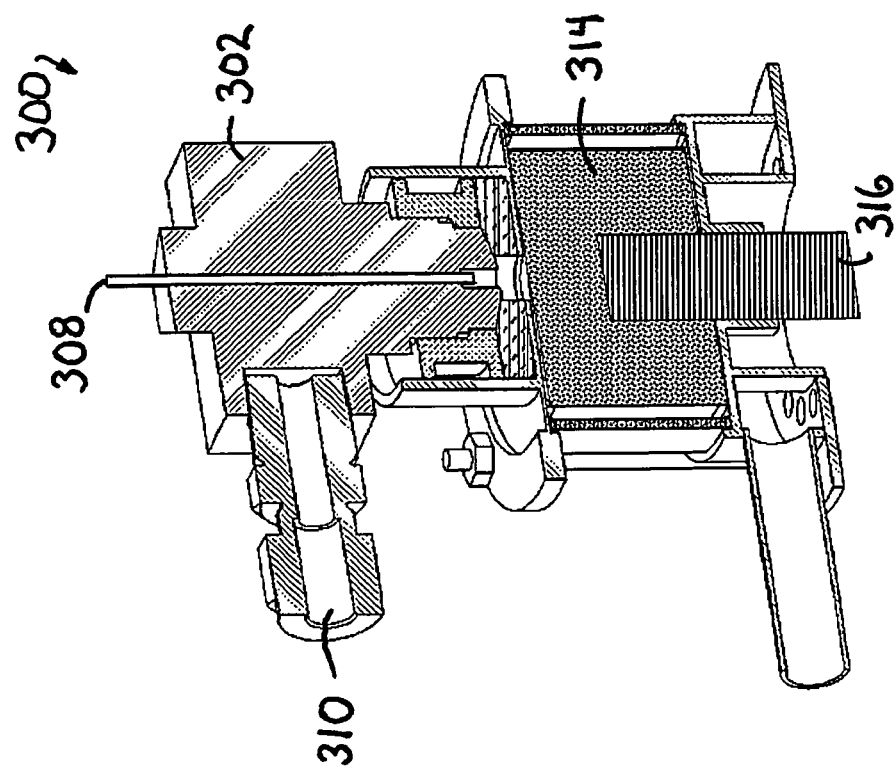

FIGS. 4a and 4b provide a three-dimensional rendering of detailed design of a gasification system (300) according to the present invention. A Reforming reactor comprised a coiled catalyst bed, a fuel atomization nozzle and a start up glow plug. The reactor comprises the core of the reforming system, which system is further incorporated into a system comprising a heat exchanger/steam generator, ZnO de-sulfurization bed and fuel, air and water pump. The Reforming reactor was enclosed in a quartz housing to enable visual observation of the catalyst temperature uniformity. The reactor was also equipped with eight thermocouples for studying temperature distribution within the catalyst bed. Gasification system (300) is an embodiment of gasification system (200) described hereinabove and some of the features are called out using similar characteristics numbers for descriptive and illustrative purposes.

FIG. 4a depicts the system (300), catalyst bed (314), and heat/ignition source (316). FIG. 4a also depicts, among other features described hereinabove with reference to FIG. 3, cold fuel liquid stream inlet (308), oxidizer stream inlet (310), and nozzle (302).

Figure 5:
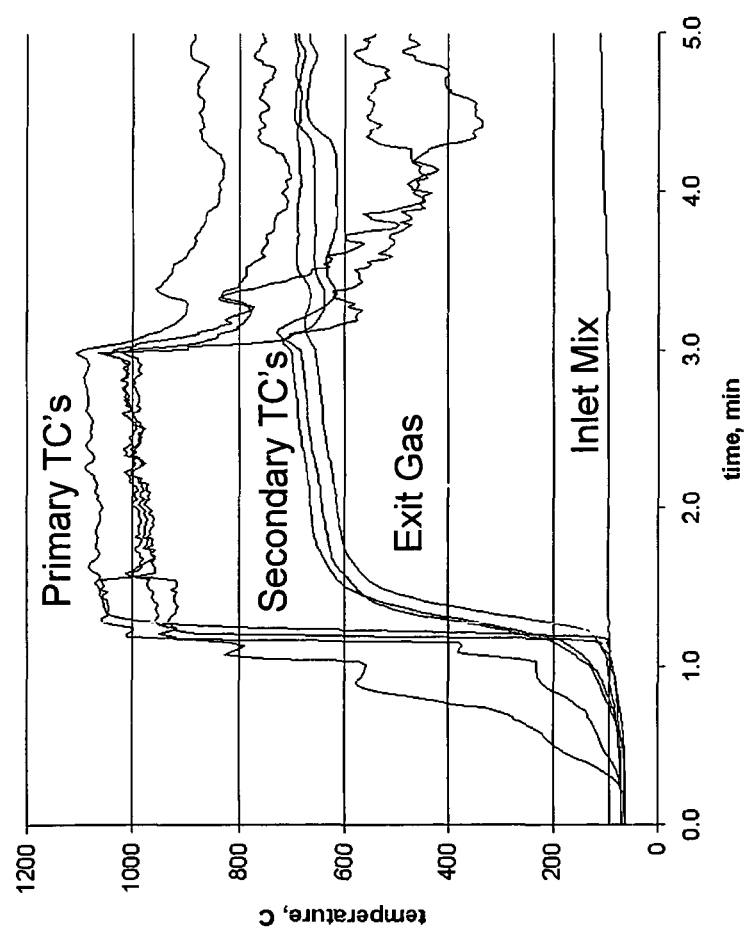
FIG. 5 provides a graphical representation of lightoff temperature versus time in a gasification system according to the present invention.

The glow plug permits the reactor to lightoff at ambient conditions. In order to start the reactor, 12 V DC potential is applied to the glow plug providing heat directly to the catalyst. This results in catalyst temperature increasing to above lightoff temperature in about 30 seconds. Fuel flow is then started resulting in the reactor lightoff and transition to operational state in about 1 minute. As the catalyst lights off, the glow plug is shut off and steam flow to the reactor is started. This causes temperature decrease on the front of the catalyst bed, such that more air can be added to the reactor and complete fuel conversion achieved. Reactor temperatures during the lightoff process are shown in FIG. 5.

Figure 6:
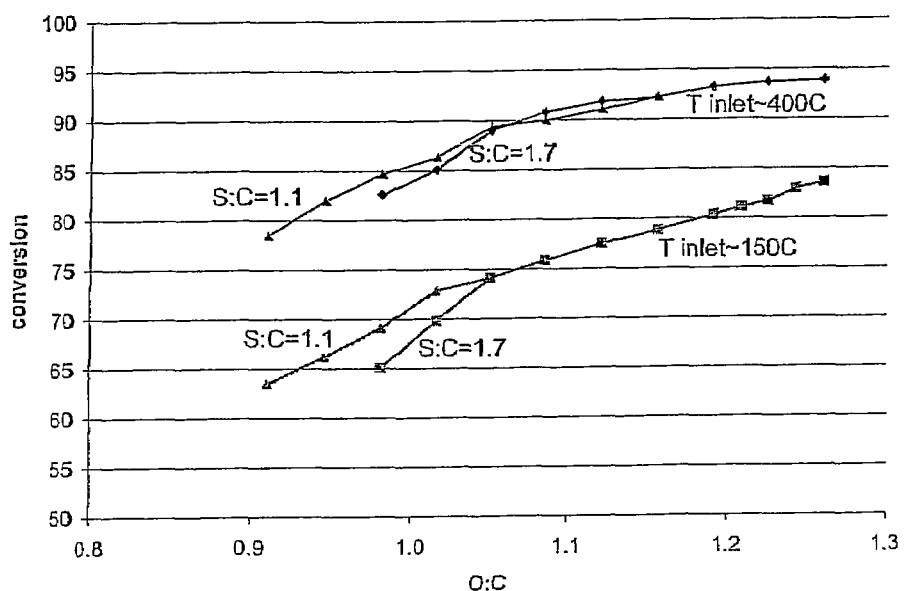
FIG. 6 provides a graphical representation of the dependence of fuel conversion on the air-to-fuel ratio in a gasification system according to the present invention.

The reformate gas was analyzed by a GC at each O:C setting to measure the gas composition and an Auto Thermal Reforming (ATR) reactor performance. The inlet temperature and the S:C ratio were then varied and the O:C scan repeated to measure the dependence of the ATR performance on inlet temperature, air-to-fuel ratio (O:C) and steam-to-fuel ratio (S:C). The results are provided in FIG. 6. It was found that the reactor could be operated with low water addition (S:C~1). It was also found that increasing the inlet temperature improved reactor performance. At 400°C and S:C =1.1, the JP-8 reforming efficiency (LHV based) was ~65%. Note that due to equipment tolerances analytical considerations resulted in a maximum 95% material balance. The flattening of the conversion curve indicates that this corresponds in actuality to essentially complete fuel conversion.

Figure 7:
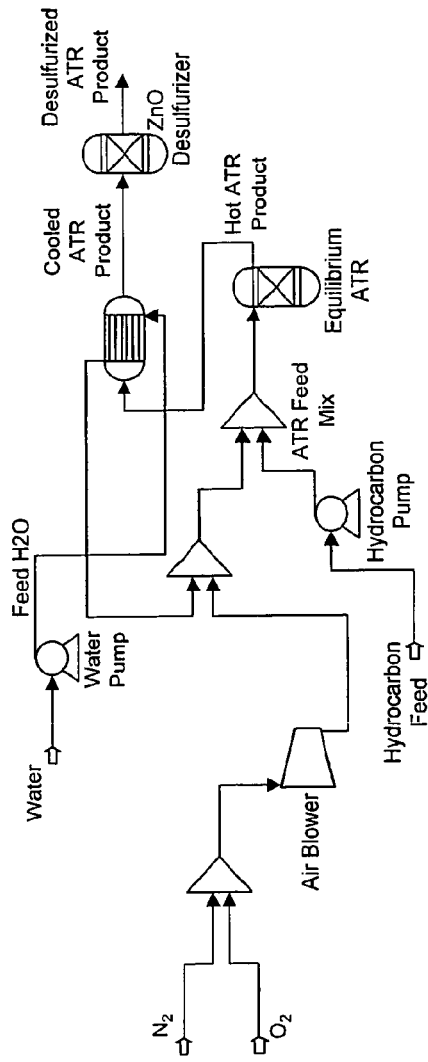
FIG. 7 provides a schematic flow diagram of a gasification system according to the present invention.

ASPEN® modeling was used to examine and determine the system layout including sensitivities to water addition/ recycle/recapture and their associated impacts. The system configuration is illustrated in FIG. 7. The system operates at approximately 1-2 atm. The ATR feed water is delivered to a heat exchanger where it is vaporized prior to mixing with air supplied at the same pressure. The steam/air mix is combined with hydrocarbon fuel (represented by dodecane) through a nozzle, prior to delivery to the ATR. The ATR is represented as an adiabatic reactor yielding an equilibrium product distribution. The hot ATR product serves as the heat source for vaporizing the feed water. This is a benefit because it allows low temperature valving to be used to control the reformate flows.

Typically, the feed O/C ratio was fixed and two convergence criteria were imposed on the simulation. The first required that the temperature of the steam exiting the heat exchanger was sufficient to achieve a specified ATR mixed feed temperature (300° C.-400° C.). The second required that the temperature of the cooled ATR product leaving the heat exchanger be compatible with effective sulfur removal in a downstream ZnO bed (typically 300°-350° C.). This was controlled by regulating the water feed rate. Thus, for a given O/C, the S/C ratio was that value which simultaneously satisfied these two requirements. Case studies showed that there was a preferred O/C range (~1.1-1.2) below which target ATR feed temperatures could not be achieved and above which system efficiencies declined excessively. As an example, at a fixed O/C of 1.2, acceptable operation for a 400° C. target ATR feed temperature and a 300° C. ATR product temperature exiting the heat exchanger, could be obtained at a feed S/C of 2.16. The resultant LHV based thermal efficiency for these conditions was ~75% for the reforming system (including BOP parasitics but not including fuel-cell efficiency). Without a fuel cell, heat integration was relaxed in the system prototype. Integration of heat and water-recovery from the downstream SOFC will be required when operating with the stack.

Figure 8:
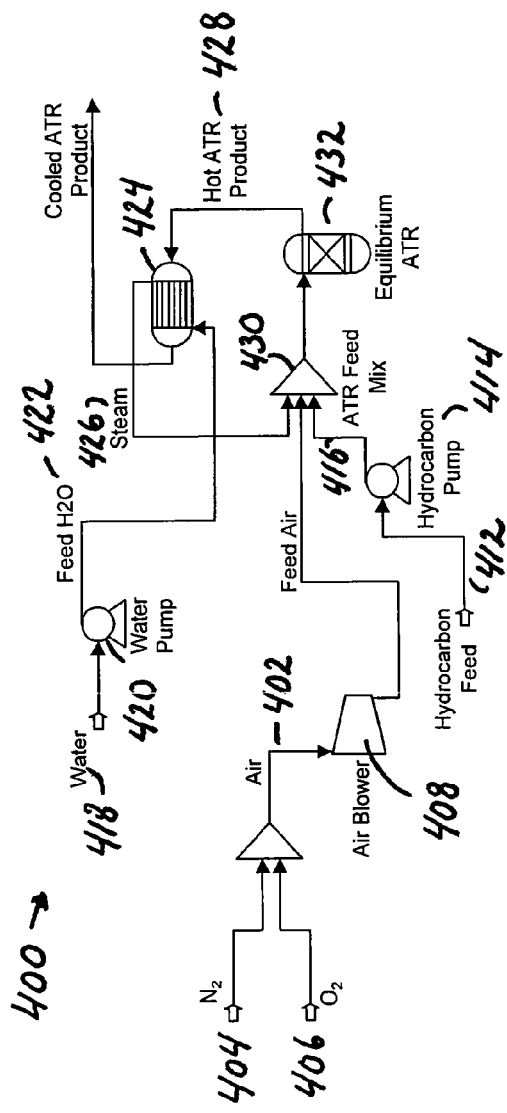
FIG. 8 depicts a schematic of a system for onboard reforming of fuel and production of hydrogen in accordance with the present invention.
Figure 9:
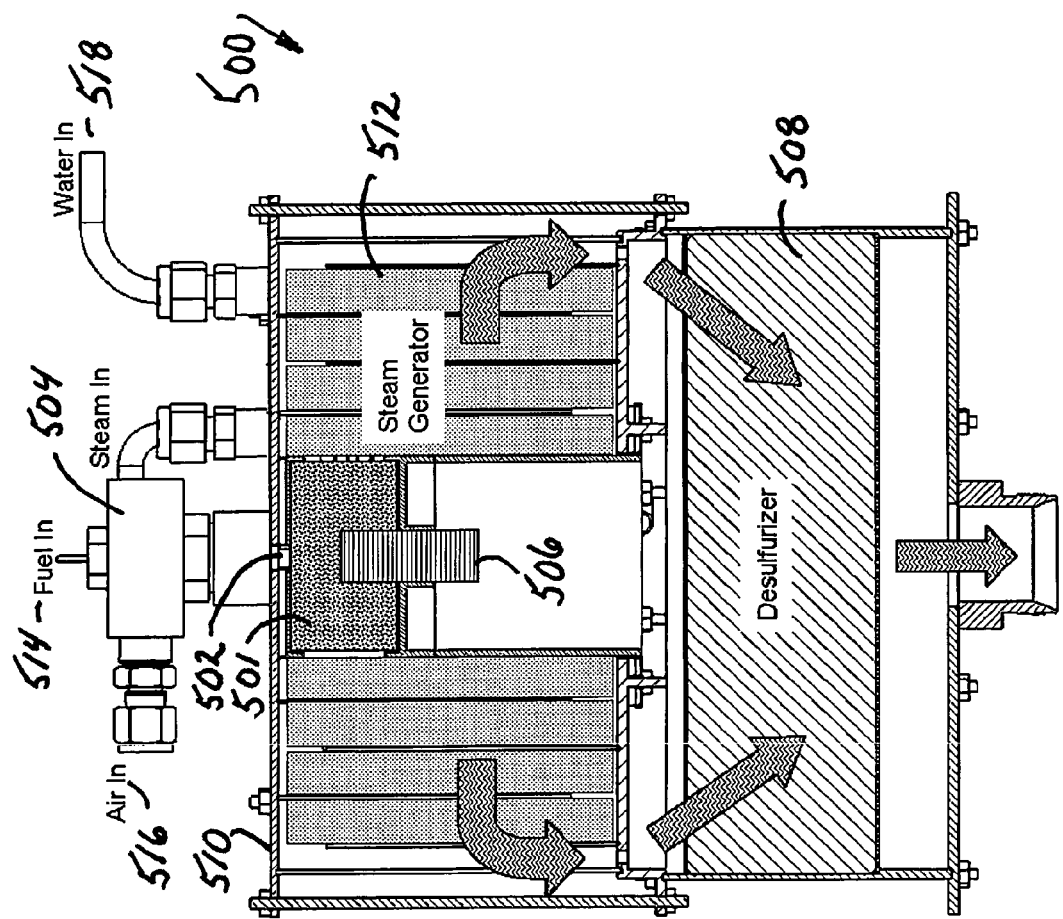
FIG. 9 depicts a cut-away diagram of a system for onboard reforming of fuel and production of hydrogen in accordance with the present invention.

Another embodiment of the present invention is illustrated schematically in FIG. 8. Fuel reforming system 400 comprises a supply of air 402 that, in turn, comprises oxygen 404 and Nitrogen 406. Air 402 is passed through a compressor 408 and feed air 410 is passed to an ATR Feed Mixer 430. A hydrocarbon source stream (fuel) 412 is passed through a feed pump 414 and the hydrocarbon feed 416 is passed to ATR Feed Mixer 430. The fuel/air mixture exits ATR Feed Mixer 430 and is passed to an Equilibrium ATR 432. A glow plug may be used for startup of the reactor (as shown in FIG. 9 and described with respect thereto). Hot ATR product 428 is passed to heat exchanger (or steam generator) 424. Water 418 is passed to feed water pump 420 and feed water 422 is passed to heat exchanger 424. Steam 426 exits heat exchanger 424 and is passed back to ATR Feed Mixer 430. Cooled ATR product exits the system.

Another embodiment of the present invention is illustrated in FIG. 9. Fuel reforming system 500 of the present invention comprises a coiled reactor 501, a fuel injector/atomizer 504, a mixing region 502, and a glow plug 506 for startup. Advantageously, a desulferizer 508 may be added to system 500. The system is contained within an appropriate housing 510 that further houses steam generator 512. System 500 further comprises a fuel input 514, an air input 516, and a water input 518. Although the system illustrated includes a water input and a steam generator, the system has effectively reformed fuel without the use of water.

Figures 10, 11:
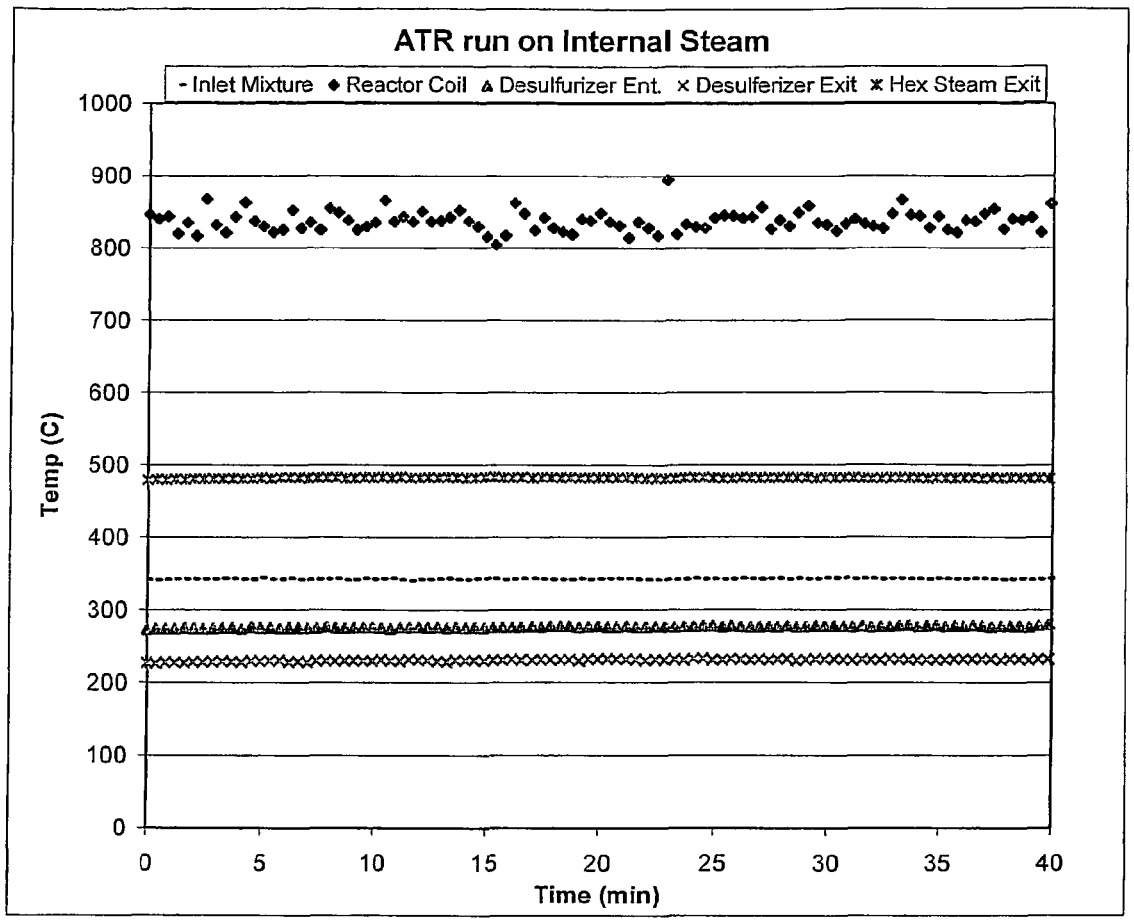
FIG. 10 provides a tabular representation of the results achieved from running the embodiment illustrated in FIG. 9.
FIG. 11 provides a tabular representation of the results achieved from running the embodiment illustrated in FIG. 9.

The results of running the ATR reactor of FIG. 9 on internal steam generated from within the system are shown in FIG. 10.

The results show that the ATR operating temperature remains substantially consistent, within the range of about 800° C. to about 900° C., and use of a desulferization unit reduces the amount of sulfer exiting the system. FIG. 11 provides a tabular representation of the resultant stream rates of the system illustrated in FIG. 9.

Although the invention has been described in considerable detail with respect to reactively converting a liquid fuel into a gasified stream by partial oxidation and steam reforming, and the reforming of diesel fuel utilizing an ATR reactor, it will be apparent that the invention is capable of numerous modifications and variations, apparent to those skilled in the art, without departing from the spirit and scope of the invention.

What is claimed:

1. A system for converting a liquid fuel into a gasified stream, the system comprising:
    a) a nozzle having an outlet for feeding a fuel and an oxidant into contact with a reforming catalyst;
    b) a fuel inlet for feeding the fuel into the nozzle;
    c) an oxidant inlet for feeding the oxidant into the nozzle;
    d) the reforming catalyst positioned downstream from the outlet of the nozzle, the catalyst being supported on a substrate comprising a metal screen in a coiled configuration having an inner diameter and an outer diameter and a radial flow path;
    e) an ignition source located inside the inner diameter of the metal screen for igniting the catalyst;
    f) a heat exchanger placed within the system downstream of the catalyst such that a hot side of the heat exchanger is in fluid communication with the catalyst and a cold side of the heat exchanger is in fluid communication with a supply of water so as to produce steam; and further such that the heat exchanger is displaced radially with respect to a center axis of the coiled metal screen and the heat exchanger has a flow path positioned in crossflow direction with respect to the radial flow path of the coiled metal screen;
    g) a means for feeding steam into contact with the catalyst.

2. The system of claim 1 wherein the nozzle is selected from pressure atomization, air blast, ultrasonic atomization and electrospray nozzles.

3. The system of claim 1 comprising an autothermal reactor.

4. The system of claim 1 wherein the fuel comprises diesel fuel.

5. The system of claim 1 wherein the oxidant comprises oxygen as a constituent of air.

6. The system of claim 1 wherein the catalyst comprises a Group VIII metal catalyst supported on the metal screen.

7. The system of claim 6 wherein the Group VIII metal catalyst comprises rhodium and alumina.

8. The system of claim 1 wherein the ignition source comprises a glow plug.

9. The system of claim 1 further comprising a desulfurization bed positioned downstream from the catalyst and in fluid communication with the heat exchanger.

10. The system of claim 1 wherein the metal screen in coiled configuration comprises a multiplicity of void volumes in random order.

* * * * *